(12) United States Patent
Hwang

(10) Patent No.: US 9,066,057 B2
(45) Date of Patent: Jun. 23, 2015

(54) IMAGE FORMING APPARATUS PROCESSING FILE ACCORDING TO INDEX INFORMATION AND METHOD THEREOF

(75) Inventor: Jae-won Hwang, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 423 days.

(21) Appl. No.: 11/870,609

(22) Filed: Oct. 11, 2007

(65) Prior Publication Data

US 2008/0088705 A1   Apr. 17, 2008

(30) Foreign Application Priority Data

Oct. 11, 2006 (KR) .................. 10-2006-0099070

(51) Int. Cl.
- *H04N 1/00* (2006.01)
- *H04N 5/76* (2006.01)
- *H04N 5/765* (2006.01)
- *H04N 9/82* (2006.01)

(52) U.S. Cl.
CPC .............. *H04N 5/76* (2013.01); *H04N 5/765* (2013.01); *H04N 9/8205* (2013.01)

(58) Field of Classification Search
CPC ................. H04N 2201/3226; H04N 1/32122
USPC .............. 358/403; 348/207.99, 207.1, 207.2; 710/33
See application file for complete search history.

(56) References Cited

U.S. PATENT DOCUMENTS

| | | | | |
|---|---|---|---|---|
| 5,664,133 | A * | 9/1997 | Malamud et al. | 715/816 |
| 6,249,316 | B1 * | 6/2001 | Anderson | 348/333.05 |
| 6,563,542 | B1 * | 5/2003 | Hatakenaka et al. | 348/333.02 |
| 6,715,003 | B1 * | 3/2004 | Safai | 710/33 |
| 2003/0039410 | A1 * | 2/2003 | Beeman et al. | 382/305 |
| 2004/0218046 | A1 | 11/2004 | Kim | |
| 2006/0044601 | A1 * | 3/2006 | Misawa et al. | 358/1.15 |

FOREIGN PATENT DOCUMENTS

| | | |
|---|---|---|
| JP | 1998-336579 | 12/1998 |
| JP | 2005-318492 | 11/2005 |
| KR | 2005-12599 | 2/2005 |
| KR | 2005-94538 | 9/2005 |

OTHER PUBLICATIONS

Korean Office Action issued May 18, 2011 in KR Application No. 10-2006-0099070.

* cited by examiner

*Primary Examiner* — Paul F Payer
(74) *Attorney, Agent, or Firm* — Staas & Halsey LLP

(57) ABSTRACT

An image forming apparatus includes: an image processing unit; a display part which displays a plurality of files; an input part which receives at least one index information with respect to at least one of the files; a storing part which stores the files and the received index information together; and a control part which classifies the files according to the received index information, and controls the image processing unit to process files which includes a selected index information.

14 Claims, 5 Drawing Sheets

UI

| INDEX INFORMATION | IMAGE PROCESS TYPE |
|---|---|
| A | IMAGE FORMING |
| B | E-MAIL TRANSMITTING |
| C | FAX + E-MAIL TRANSMITTING |

FIG. 2
001.JPG(F01)
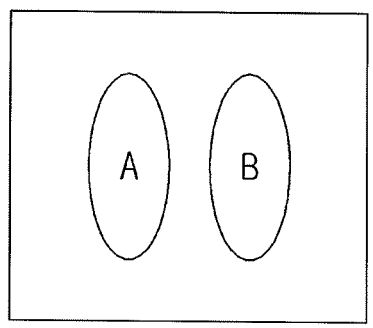
→ A + B(ID)
002.JPG(F02)
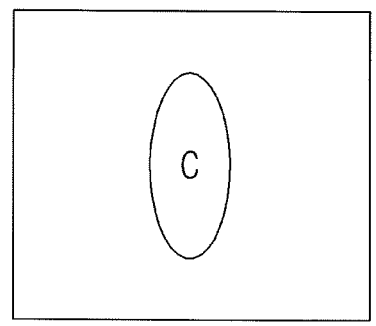
→ C(ID)
003.JPG(F03)
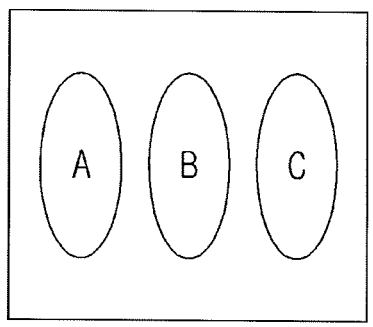
→ A + B + C(ID)
004.JPG(F04)
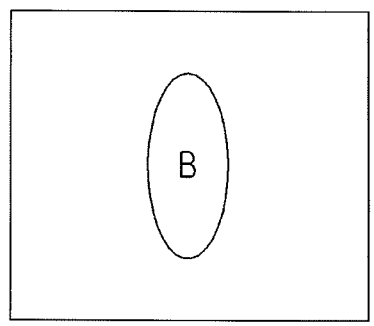
→ B(ID)

FIG. 3

| ID | A | B | C |
|---|---|---|---|
| F | 001.JPG<br>003.JPG | 001.JPG<br>003.JPG<br>004.JPG | 002.JPG<br>003.JPG |

ID List

FIG. 4

| INDEX INFORMATION | IMAGE PROCESS TYPE |
|---|---|
| A | IMAGE FORMING |
| B | E-MAIL TRANSMITTING |
| C | FAX + E-MAIL TRANSMITTING |

UI

IMAGE FORMING APPARATUS PROCESSING FILE ACCORDING TO INDEX INFORMATION AND METHOD THEREOF

CROSS-REFERENCE TO RELATED APPLICATIONS

This application claims priority from Korean Patent Application No. 2006-0099070, filed on Oct. 11, 2006, in the Korean Intellectual Property Office, the disclosure of which is incorporated herein by reference in its entirety.

BACKGROUND OF THE INVENTION

1. Field of the Invention

An image forming apparatus and method consistent with the present general inventive concept relates to an image process of a file according to an index information appended to the file.

2. Description of the Related Art

Generally, an image forming apparatus materializes a file on a paper according to an out signal supplied from a host. These image forming apparatuses usually include a scanner reading a document to generate an image file, a fax part transmitting a file to a receiving fax, an e-mail transmitting part transmitting a file to an e-mail address of a receiver, and an image forming part outputting a file to a paper.

Recently, as related technologies have developed, these image forming apparatuses have been coupled with a portable host apparatus to directly transmit and receive an image file. Especially, as a photography technology of a portable digital camera and mobile phone has developed and applications thereof have been extended, it becomes more frequent that a user directly outputs a picture image file taken through the user's own image forming apparatus.

The conventional image forming apparatus materializes an image file on a paper according to selection of a user. However, in the conventional image forming apparatus such as described above, it is difficult for a user to variously select an output according to contents contained in the image file. For example, if three persons A, B and C travel together and take five pictures, a user should output the pictures onto paper to correspond to the number of persons contained in each picture, and distribute the output pictures to each of the persons. If one person A among the number of persons wants to receive a picture containing A by his or her e-mail address, the user should transmit the picture containing A by e-mail through a separate host apparatus, or the user should scan the picture to generate an image file, and then transmit the generated image file by e-mail.

SUMMARY OF THE INVENTION

The present general inventive concept provides an image forming apparatus that receives index information appended to a file, and processes the file by different image processing parts according to the appended index information.

Additional aspects and utilities of the present general inventive concept will be set forth in part in the description which follows and, in part, will be obvious from the description, or may be learned by practice of the general inventive concept.

The foregoing and/or other aspects of the present general inventive concept can be achieved by providing an image forming apparatus comprising: an image processing unit; a display part which displays a plurality of files; an input part which receives at least one index information with respect to at least one of the files; a storing part which stores the files and the received index information together; and a control part which classifies the files according to the received index information, and controls the image processing unit to process files which include a selected index information.

The image processing unit may comprise a plurality of image processing parts which comprise different functions, and the control part controls the display part and the input part so that at least one of the image processing parts which correspond to the selected index information can be selected.

The control part allows at least one of the pluralities of image processing parts to be selected by the index information The files may comprise a text file and an image file.

If the files comprise the text file, part of data included in the text file is displayed by the index information.

If the files comprise the image file, the index information displays at least one of person's information, environment information and material information of an image included in the image file.

The input part inputs the index information by means of a letter, a number, a sign and a combination of the letter, the number and the sign.

The plurality of image processing parts comprise an image forming part which materializes the file in a print media, a fax part which transmits the file to a predetermined receiving fax, and an e-mail transmitting part which transmits the file to an external server.

The foregoing and/or other aspects of the present general inventive concept can also be achieved by providing an image forming apparatus comprising: an image processing unit; a display part which displays a plurality of files; and a control part which classifies the files according to received index information with respect to at least one of the plurality of files, and controls the image processing unit to process files which includes a selected index information.

The foregoing and/or other aspects of the present general inventive concept can also be achieved by providing a method of processing files of an image forming apparatus, the method comprising: displaying a plurality of files; providing at least one index information with respect to at least one of the files; storing the files and the received index information together; and classifying the files according to the received index information, and processing the files which include selected ones of the index information.

The foregoing and/or other aspects of the present general inventive concept can also be achieved by providing a method of processing files of an image forming apparatus, the method comprising: recalling a stored file from a storage; displaying the recalled file; inputting index information according to a desired classification with respect to the file displayed; storing the index information with the file together; classifying the stored file according to the index information; and selecting a file classification according to the index information and an image processing part to process the file based on the index information.

BRIEF DESCRIPTION OF THE DRAWINGS

The above and/or other aspects and utilities of the prevent general inventive concept will become apparent and more readily appreciated from the following description of the exemplary embodiments, taken in conjunction with the accompanying drawings, in which:

FIG. 2 illustrates an example of an index information input process of an input part according to the exemplary embodiment of FIG. 1;

FIG. 3 is a table illustrating an example of an index information list according to the exemplary embodiment of FIG. 1;

FIG. 4 is a table illustrating an example of the type of image processes by index information according to the exemplary embodiment of FIG. 1.

DETAILED DESCRIPTION OF THE PREFERRED EMBODIMENTS

Figure 1:
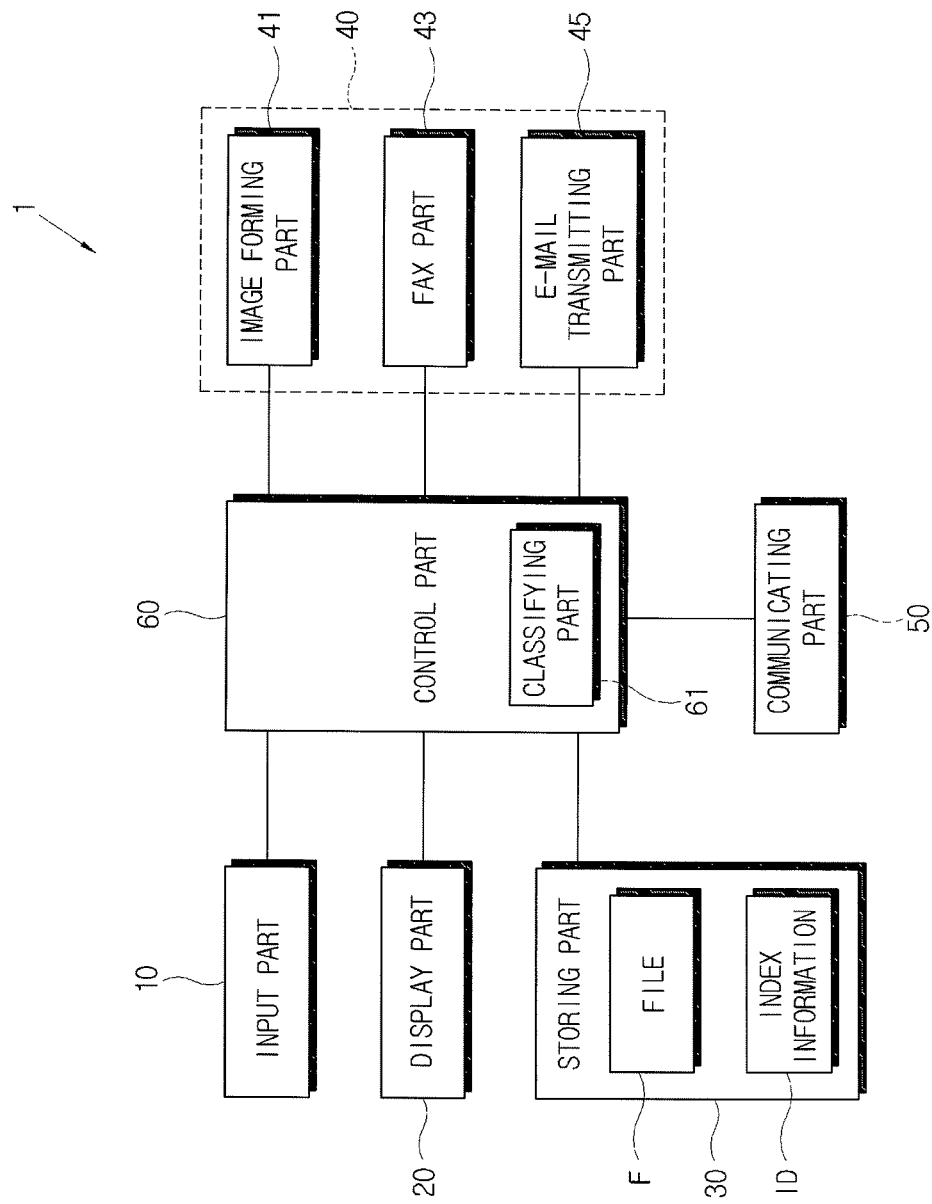
FIG. 1 is a block diagram schematically illustrating a configuration of an image forming apparatus according to an exemplary embodiment.
Figure 5:
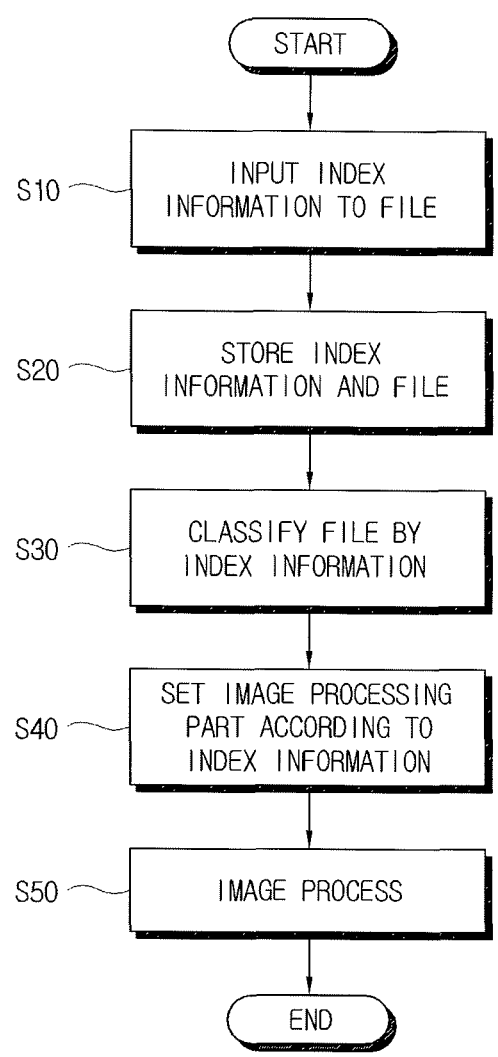
FIG. 5 is a flow chart illustrating an image form process of the image forming apparatus according to the exemplary embodiment of FIG. 1.

Reference will now be made in detail to the embodiments of the present general inventive concept, examples of which are illustrated in the accompanying drawings, wherein like reference numerals refer to like elements throughout. The embodiments are described below so as to explain the present general inventive concept by referring to the figures.

As illustrated in FIG. 1, an image forming apparatus 1 according to an exemplary embodiment comprises an input part 10 to receive an index information ID with respect to a file, a display part 20 to display the file, a storing part 30 to store the file and the index information ID, an image processing unit 40 to perform an image processing of the file, a communicating part 50 to communicate with a host (not shown), and a control part 60 to control the image processing part 40 to perform the image processing of the file according to the index information ID.

The display part 20 displays the file F. The file comprises a data file and an image file. The display part 20 may have a predetermined size so that a user can view contents of the data file and the image file. Also, the display part 20 may comprise a flat panel display, such as a liquid crystal display (LCD), etc., to reduce the size of the image forming apparatus 1. The display part 20 may comprise a touch screen when necessary.

The input part 10 can receive the index information ID of the file F displayed by the display part 20 from a user. The index information ID may be variously input according to the type of the file F. If the file F is a text file, it may be displayed based on whether predetermined contents or important contents are contained in the data file. For example, if the file F is a data file containing a plurality of pages, each page of the data file may be displayed, and a user may input the index information ID according whether each page contains a specific word, phrase, sentence, table and figure. Also, for a plurality of files F containing a single page, the index information ID may be input according to importance or frequency of use of each file in the files F.

If the file F is an image file such as a photograph or a figure, the index information ID may comprise at least one of a person's information, environment information and a material information contained in the image file. For example, if the image file is a photograph, the person's information may comprise a person's name and the number of characters in the photograph, whether to be an individual photograph or a group photograph, etc. The environment information may be input according to background scene information of the photograph. The material information may comprise content property information in the photograph.

The input part 10 may comprise an input pad including letter keys, number keys and special keys through which various index information ID can be input. The index information ID may be set by a combination of the input pad according to a setting of a user, or may be input by providing a separate index information input key. An input of an index information ID of the input part 10 will be described while referring to FIG. 2, as an example. If two persons are contained in File 1 (001.jpg) displayed in the display part 20, a user can index each person with a name. That is, a first person is indexed with 'A', and a second person is indexed with 'B'. Then, the user selects an index information input key with respect to File 1 (001.jpg), and inputs 'A' and 'B' as the index information. The index information input key may be separately provided, or the index information may be set by inputting special letter keys such as '*', '#', '$', etc.

A third person is contained in File 2 (002.jpg), and the user inputs 'C' as the index information corresponding to the third person. Since File 3 (003.jpg) contains three persons, 'A', 'B' and 'C' are input as the index information ID corresponding to each person. Here, the index information ID may be input without order. Since File 4 (004.jpg) contains a single person 'B', only 'B' is input as the index information ID.

As illustrated in FIG. 2, in the present exemplary embodiment, the user uses alphabets 'A', 'B' and 'C' for each person as the index information ID. However, Korean letters such as 'ㄱ', '가', '나',', etc., or numbers '1', '2', '3', etc., may be variously indexed according to a selection of the user.

Also, in an embodiment, the index information ID can refer to the image data contained in the file F. Alternatively, if backgrounds of File 1 (001.jpg) and File 2 (002.jpg) are a mountain and backgrounds of File 3 (003.jpg) and File 4 (004.jpg) are a sea, the user may additionally or separately input the index information ID according to the backgrounds.

The storing part 30 stores the file F received through the communicating part 50, and the index information ID corresponding to the received file F together. The storing part 30 may comprise a non volatile memory or a volatile memory, or may comprise an external memory or an interior memory.

The image processing unit 40 comprises a plurality of image processing parts 41, 43 and 45 to selectively process a file F according to a control signal of the control part 60. The image processing parts 41, 43 and 45 may comprise an image forming part 41 to materialize the file F on a paper, a fax part 43 to transmit the file F to a receiving fax, and an e-mail transmitting part 45 using an internet to transmit the file F to an e-mail address of a receiver.

The image forming part 41 may employ an ink jet type that applies an ink drop on a paper to form an image, an electro-photography type that transfers a developer applied to a light sensitive drum to a paper according to a potential difference to form an image, a thermal transfer type to press and heat an ink ribbon against a paper to transfer ink of the ink ribbon to the paper, and a dye sublimation type to press and heat a paper containing an ink layer to form an image. Here, since the thermal transfer type and the dye sublimation type have a good image durability against moisture and other properties, a good preservation, and a good resolution, the thermal transfer type and the dye sublimation type are preferable to output of an image file such as a photograph.

The fax part 43 converts the file F into an electric signal, and transmits the converted electric signal to a receiving fax through a telephone line. The fax part 43 may transmit the file F through an internet.

The e-mail transmitting part 45 transmits the file F to an e-mail address of a receiver. The e-mail transmitting part 45 transmits the file F to an e-mail server of a sender side, and transmits the file F from the e-mail server of the sender side to an e-mail server of a receiver side.

The communicating part 50 receives a file F, and interlocks with the image processing part 40 to help an image processing of the file F. The communicating part 50 can be connected with a host (not shown) storing a file F to receive the file F, or can be connected to a telephone line to help a fax transmission of the fax part 43. Also, the communicating part 50 can be connected to an internet to help an e-mail transmission of the e-mail transmitting part 45. Here, the host connected to the communicating part 50 may comprise a computer, a notebook (laptop PC), a digital camera, a camcorder, a USB memory, an SD card, a CF card, or other various configurations.

The control part 60 classifies the file F according to the index information ID, and controls the image processing parts 41, 43 and 45 so that the image processing parts 41, 43 and 45 can process the file F according to a selection of a user. The control part 60 comprises a classifying part 61 to classify the file F according to the index information ID. The classifying part 61 classifies the file F according to the index information ID input by the user. For example, as illustrated in FIG. 3, the classifying part 61 classifies the file F according to the index information 'A', 'B' and 'C' indexed according to the person data contained in the file F. Accordingly, the file F is classified into 001.jpg and 003.jpg containing the index information 'A', 001.jpg, 003.jpg and 004.jpg containing the index information 'B', and 002.jpg and 003.jpg containing the index information 'C'. Accordingly, the file can be classified according to the person contained in the image file.

The control part 60 displays an ID index list classified by the classifying part 61 in the display part 20, and controls the image processing parts 41, 43 and 45 to process the file F according to the index information ID. The control part 60 selects among the image forming part 41, the fax part 43 and the e-mail transmitting part 45 to perform image processing operations corresponding to the index information ID. For example, as illustrated in FIG. 4, the file F containing the index information 'A' can be set to be printed by the image forming part 41, the file F containing the index information 'B' can be set to be transmitted by the e-mail transmitting part 45, and the file F containing the index information 'C' can be set to be concurrently transmitted by the fax part 43 and the e-mail transmitting part 45.

Here, the control part 60 may control a user interface (UI) generating part (not shown) to generate a UI as illustrated in FIG. 4, display the UI in the display part 20, and be input with the index information corresponding to the image processing parts 41, 43 through the input part 10. A user may select a plurality of image processing parts 41, 43 and 45 according to the index information ID. Also, some of the image processing parts 41, 43 and 45 may not be selected.

In the present embodiment, the image processing parts 41, 43 and 45 are selected from a user according to the index information ID. Alternatively, if a user does not select the image processing parts 41, 43 and 45 according to the index information ID, all files F may be set to be output by the image forming part 41.

Hereinafter, an image processing process of the image forming apparatus 1 according to an exemplary embodiment of the present general inventive concept will be described while referring to FIGS. 1 to 5.

A user can first recall the file F stored in the storing part 30, and display the file F at the display part 20. The user inputs index information according to a desired classification with respect to the file F displayed at the display part 20 (operation S10). The desired classification may comprise at least one of person's information, material information, environment information and content information. The user supplies an index input signal through the input part 10. The control part 60 recognizes information input after the index input signal as the index information ID corresponding to the file F, and controls the storing part 30 to store the index information ID with the file F together (operation S20).

Here, a plurality of files F may be stored together in an album or a folder. After the user inputs all index information with respect to a single folder or a single album, the user selects a file classification according to the index information through the input part 10. Then, as illustrated in FIG. 3, the classifying part 61 classifies the file F stored in the storing part 30 according to the index information ID (operation S30). The control part 60 displays an image processing part selecting UI as illustrated in FIG. 4 in the display part 20 so that the user can select the image processing parts 41, 43 and 45 to process the file F by each index information ID. Then, at least one of the image processing parts 41, 43 and 45 corresponding to each index information ID are selected by the user (operation S40).

The control part 60 controls the image processing parts 41, 43 and 45 so that the image processing parts 41, 43 and 45 selected by the user can process the file F containing the index information. For example, as illustrated in FIG. 4, the control part 60 controls the image forming part 41 to output 001.jpg and 003.jpg containing the index information 'A' on a paper. Also, the control part 60 controls 002.jpg and 003.jpg containing the index information 'C' to be transmitted to a fax device and an e-mail address of a receiver through the fax part 43 and the e-mail transmitting part 45.

The described image forming apparatus according to the various embodiments allows a user to append index information based on information contained in a file, and process a plurality of files by different image processing parts according to the appended index information.

Also, the image forming apparatus according to the various embodiments variously processes an image file such as a picture as necessary, thereby improving convenience of a user.

Also, the image forming apparatus according to the various embodiments concurrently processes a plurality of pictures by an album unit or a folder unit, thereby reducing time and costs of a user.

As described above, the embodiments herein provide an image forming apparatus appended with index information based on information contained in a file by a user, and process a plurality of files through different image processing parts according to the appended index information.

Although a few exemplary embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus comprising:
   an image processing unit that comprises a plurality of image processing parts which perform different functions, the different functions comprising at least one of printing, a fax transmission, and an email transmission;
   a display part to display at least one of text and image type files;
   an input part to receive at least one index information to append an index information identification (ID) to the at least one of the text and the image type files;
   a storing part to store the files and the received index information together; and
   a control part to select at least one of the image processing parts according to the appended index information ID to process the files corresponding to each of the at least one of the text and the image type files, to classify the files according to the appended index information ID of the at least one of the text and the image type files of the received index information, and to control the at least one of the image processing parts to perform at least one of the different functions corresponding to the selected at least one of the image processing parts on the classified files by processing to materialize the at least one of the text and the image type files to output at least one of a printed at least one of the text and the image type files, an email of the at least one of the text and the image type files, and a facsimile of the at least one of the text and the image type files according to the appended index information ID, wherein the files are classified by the appended index information ID according to a subject contained in an image of the at least one image type files, wherein the at least one text and image type files is individually displayed to be appended with the index information ID, wherein the index information ID corresponding to the one or more image processing parts is appended to each of the displayed at least one of the text and the image type files, and wherein the control part controls the display part to display a user interface which indicates the appended index information ID and information on the different functions corresponding to the appended index information ID.

2. The image forming apparatus according to claim 1, wherein
the control part controls the display part and the input part so that at least one of the image processing parts which correspond to the selected index information can be selected.

3. The image forming apparatus according to claim 1, wherein the control part allows at least one of the plurality of image processing parts to be selected by the index information.

4. The image forming apparatus according to claim 1, wherein the files comprise a text file and an image file.

5. The image forming apparatus according to claim 4, wherein the index information includes at least one of a person's information, environment information and material information included in the image file.

6. The image forming apparatus according to claim 5, wherein the input part inputs the index information by means of a letter, a number, a sign and a combination of the letter, the number and the sign.

7. The image forming apparatus according to claim 6, wherein when backgrounds of the files are a mountain and/or a sea, the index information can separately or additionally be input according to the backgrounds.

8. A method of processing files of an image forming apparatus comprising a plurality of image processing parts which perform different functions, the different functions comprising at least one of printing, a fax transmission, and an email transmission, the method comprising:
displaying at least one of text and image type files;
receiving at least one index information including the at least one of the text and the image type with respect to at least one of the files;
appending an index information identification (ID), according to the at least one index information, to the at least one of the files;
storing the files and the received index information together;

displaying a user interface which indicates the appended index information ID and information on the different functions corresponding to the appended index information ID;
selecting at least one of the image processing parts to process the files corresponding to the appended index information ID of each of the at least one of the text and the image type files of the received index information using the image processing part selecting user interface; and
classifying each of the files according to the appended index information ID of the at least one of the text and the image type files of the received index information, and
performing at least one of the different functions corresponding to the selected at least one of the image processing parts on the classified files by processing to materialize the at least one of the text and the image type files to output at least one of a printed at least one of the text and the image type files, an email of the at least one of the text and the image type files, and a facsimile of the at least one of the text and the image type files according to the appended index information ID, wherein the files are classified by the appended index information ID according to a subject contained in an image of the at least one image type files, wherein the at least one text and image type files is individually displayed to be appended with the index information ID, and wherein the index information ID corresponding to the one or more image processing parts is appended to each of the displayed at least one of the text and the image type files.

9. The method according to claim 8, wherein the performing of the function on the files comprises selecting at least one of a plurality of image processing parts based on the selected index information.

10. The method according to claim 9, wherein the files comprises an image file.

11. The method according to claim 10, wherein the index information includes at least one of a person's information, environment information, and material information included in the image file.

12. The method according to claim 11, wherein the receiving comprises inputting the index information by means of a letter, a number, a sign, and a combination of the letter, the number, and the sign.

13. The method according to claim 12, wherein the Inputting comprises, when backgrounds of the files are a mountain and/or a sea, separately or additionally inputting the index information according to the backgrounds.

14. A method of processing files of an image forming apparatus comprising a plurality of image processing parts which perform different functions, the different functions comprising at least one of printing, a fax transmission, and an email transmission, the method comprising:
displaying at least one of text and image type files;
assigning index information including the at least one of the text and the image type to each of the plurality of files;
appending an index information identification (ID), according to the index information, to each of the plurality of files;
storing the files together with the assigned index information;

displaying a user interface which indicates the appended index information ID and information on the different functions corresponding to the appended index information ID;

selecting at least one of the image processing parts according to the appended index information ID to process the files corresponding to the at least one of text and image type files; and classifying each of the files according to the appended index information ID of the at least one of the text and the image type files of the assigned index information; and performing the at least one of the different functions corresponding to the selected at least one of the image processing parts on the classified files to materialize the at least one of the text and the image type files to output at least one of a printed at least one of the text and the image type files, an email of the at least one of the text and the image type files, and a facsimile of the at least one of the text and the image type files according to the appended index information ID, wherein the files are classified by the appended index information ID according to a subject contained in an image of the at least one image type files, wherein the at least one text and image type files is individually displayed to be appended with the index information ID, and wherein the index information ID corresponding to the one or more image processing parts is appended to each of the displayed at least one of the text and the image type files.

* * * * *

UNITED STATES PATENT AND TRADEMARK OFFICE
CERTIFICATE OF CORRECTION

PATENT NO. : 9,066,057 B2
APPLICATION NO. : 11/870609
DATED : June 23, 2015
INVENTOR(S) : Jae-won Hwang et al.

It is certified that error appears in the above-identified patent and that said Letters Patent is hereby corrected as shown below:

IN THE CLAIMS

Col. 8, Lines 50-51, claim 13, delete "Inputting" and insert --inputting--, therefor.

Signed and Sealed this
Thirteenth Day of October, 2015

Michelle K. Lee
*Director of the United States Patent and Trademark Office*